United States Patent [19]

Owens

[11] Patent Number: 4,719,971
[45] Date of Patent: Jan. 19, 1988

[54] METAL-TO-METAL/ELASTOMERIC PACK-OFF ASSEMBLY FOR SUBSEA WELLHEAD SYSTEMS

[75] Inventor: Henry S. Owens, Santa Barbara, Calif.

[73] Assignee: Vetco Gray Inc., Houston, Tex.

[21] Appl. No.: 897,482

[22] Filed: Aug. 18, 1986

[51] Int. Cl.[4] .............................................. F21B 33/04
[52] U.S. Cl. .................................... 166/191; 166/196; 277/209; 285/140
[58] Field of Search ................... 166/82, 88, 208, 191, 166/196, 387, 348; 285/139, 140, 351, 18; 277/209, 211, 235 R

[56] References Cited

U.S. PATENT DOCUMENTS

| | | | |
|---|---|---|---|
| 3,489,213 | 1/1970 | Hutchison | 166/348 |
| 3,797,864 | 3/1974 | Hynes et al. | 166/88 X |
| 3,871,449 | 3/1975 | Ahlstone | 166/183 |
| 4,324,422 | 4/1982 | Rains et al. | 166/87 X |
| 4,381,868 | 5/1983 | Croy et al. | 166/88 X |
| 4,416,472 | 11/1983 | Fowler et al. | 166/88 X |
| 4,469,172 | 9/1984 | Clark | 166/88 X |

Primary Examiner—Stephen J. Novosad
Assistant Examiner—David Bagnell
Attorney, Agent, or Firm—Joseph R. Dwyer

[57] ABSTRACT

A wellhead system having a casing hanger (C) with a first sealing surface (20) within a wellhead (W) with a second sealing surface (16) spaced from said first sealing surface (20) forming annulus (14) in combination with a pack-off assembly (P) including a wedge ring (42), which in this embodiment, supports a pack-off (64) which has a first metal-to-metal seal (S-1) which sealingly engages the first sealing surface (20) upon initial movement of the pack-off (64) into the annulus (14) and a second metal-to-metal seal (S-1) which sealingly engages the second sealing surface (16) upon further movement of the wedge ring (42) urging said second pack-off seal (S-2) radially outwardly towards the first sealing surface (20). Each metal-to-metal seal may be provided with elastomeric sealing means. Two types of metal-to-metal seals (S-1, S-2) and two types of lock down means, wicker ring (40) and split ring (10), are disclosed.

17 Claims, 8 Drawing Figures

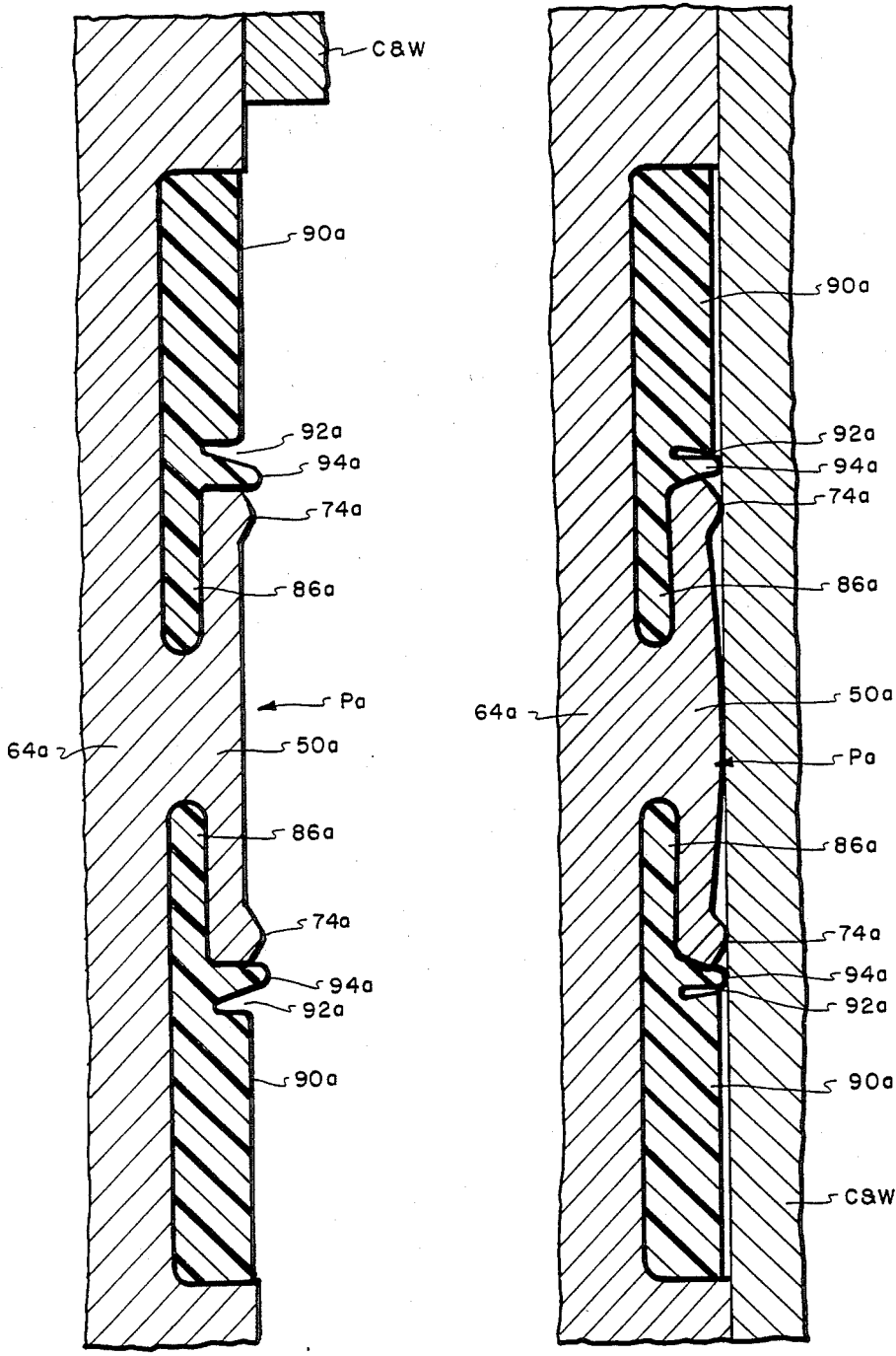

METAL-TO-METAL/ELASTOMERIC PACK-OFF ASSEMBLY FOR SUBSEA WELLHEAD SYSTEMS

BACKGROUND OF THE INVENTION

This invention relates to metal-to-metal seals and metal-to-metal seals in combination with elastomeric seals, but is specifically related to wellhead systems with such seal assemblies, often referred to as pack-off assemblies comprising such seals, for sealing the annular space, often referred to as an annulus or gland, between a wellhead casing hanger and the surrounding cylindrical wall of a wellhead.

As stated, another way, the metal-to-metal seals with or without elastomeric seals are disclosed herein in connection with wellhead systems as part of their pack-off assemblies, but such seals may also be used to seal any annulus between tubular body members.

The U.S. Pat. No. 3,468,558 and later patents such as U.S. Pat. No. 3,871,449 explain the operation and purpose of pack-off assemblies in wellheads as well as various ways of running and setting the pack-off, i.e., sealing the annulus.

These patents also show different types of pack-offs and the U.S. Pat. Nos. 3,797,864 and 4,521,040 illustrate more recent pack-offs which comprise an elastomeric ring interposed between two metallic seal rings with each metallic seal ring having a pair of lips extending toward the elastomeric material. By the compression of the elastomeric material, the lips are forced outwardly towards the surrounding walls to thus seal the annulus with both the elastomeric material and metal.

SUMMARY OF THE INVENTION

In a wellhead system having a casing hanger with a first sealing surface within a wellhead bore which forms a second sealing surface spaced from said first sealing surface in combination with a pack-off assembly including a wedge ring, which in this embodiment, supports a pack-off which has a first metal-to-metal seal with lips which sealingly engage the first sealing surface upon initial movement of the pack-off into the annulus and a second metal-to-metal seal with lips which sealingly engage the second sealing surface upon further movement of the wedge ring urging said second pack-off radially outwardly towards the first sealing surface. Each metal-to-metal seal may be provided with elastomeric sealing means which also engage the first and second sealing surfaces upon sealing engagement of said first and second metal-to-metal seals. Two types of metal-to-metal seals and two types of lock down means are described.

From the foregoing and from a more detailed description hereinafter, it will be seen that the main advantages of this invention are:

(1) The pack-off seal engaging the wellhead bore is not actuated gradually during installation thus reducing the chance that the pack-off will land high. The gap between the wellhead and the wellhead seal remains until the pack-off is completely landed. This prevents hydraulic pressure from building up below the pack-off during installation, as may happen in seals which are actuated gradually and contact both the wellhead and casing hanger surfaces during installation.

(2) The pack-off seal does not need continuous axial preload because the seals are radially actuated by cylindrical surfaces. Changes in axial preload due to pressure, thermal expansion or consolidation of debris below the pack-off will not adversely affect sealing.

(3) The springiness of the lips of the metal-to-metal seals accommodate tolerance variations, cocking, etc.

(4) The lips of the metal seals engage without gross material deformation, and are thus resettable and do not damage the seal surfaces.

(5) The metal-to-metal seals are not elastomer-actuated and are self-energizing. This allows the metal-to-metal and elastomeric seals to act as pressure is applied independently and thus increase reliability by providing redundant sealing methods.

BRIEF DESCRIPTION OF THE DRAWINGS

FIG. 7 is a view of a second embodiment of a pack-off having combined metal-to-metal seals and elastomeric seals which could be used in lieu of either or both of the metal-to-metal and elastomeric seals of the embodiments of FIGS. 1-6, and FIG. 8 illustrates the pack-off of FIG. 7 having been set, i.e., sealingly engaging one of the walls of the wellhead or casing hanger, as the case may be.

DETAILED DESCRIPTION

Figure 1:
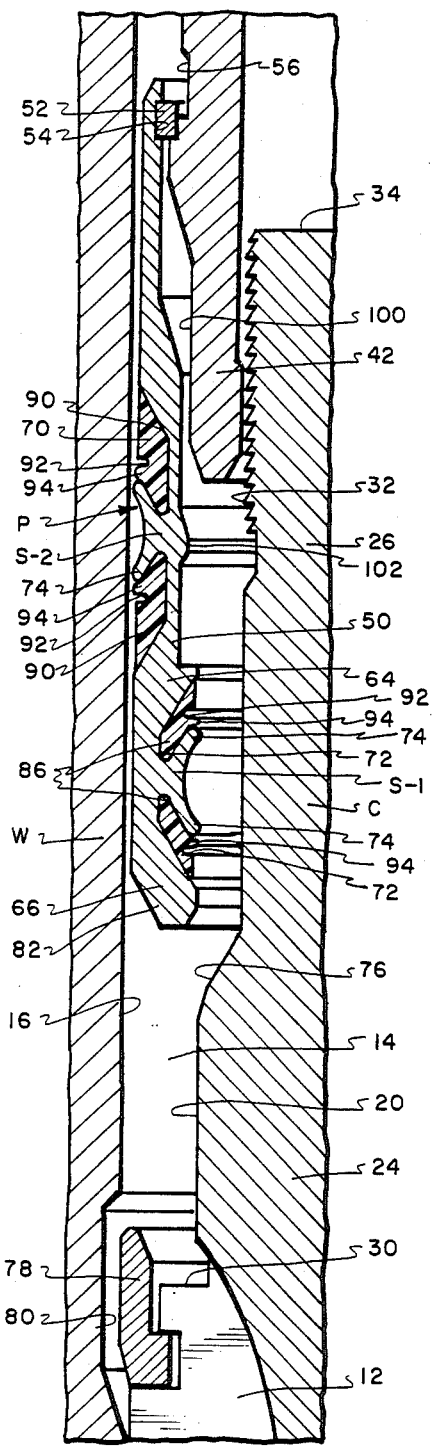
FIG. 1 is a partial cross-sectional elevational view of a wellhead system illustrating the pack-off assembly with two metal-to-metal seals in combination with elastomeric seals shown supported on a wedge ring above annulus to be sealed.
Figure 2:
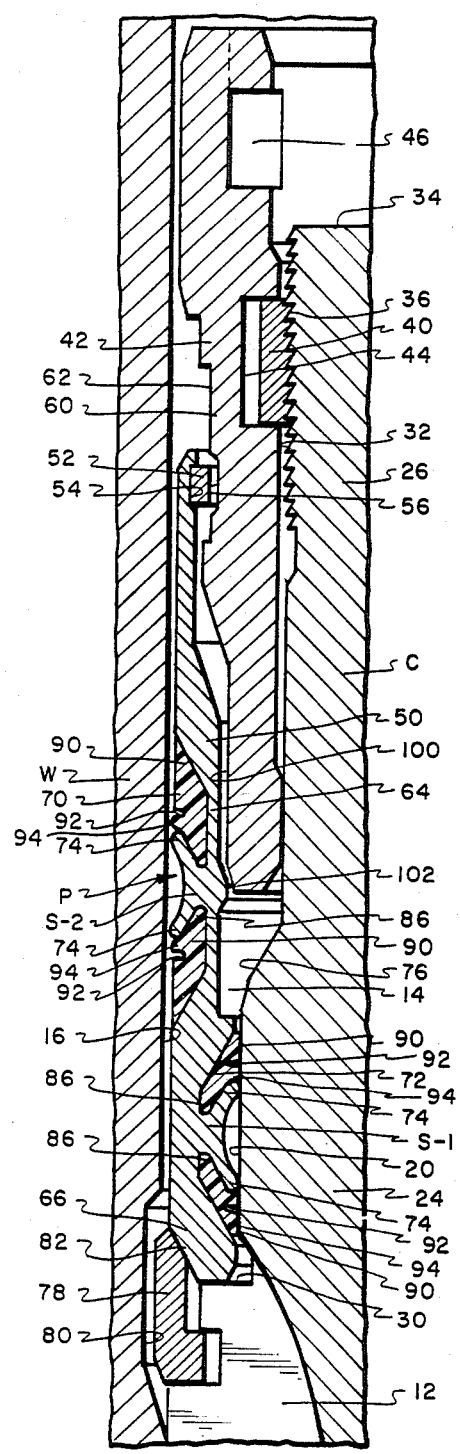
FIG. 2 is a view similar to FIG. 1 but showing one type of lock down (wicker ring), one of the two metal-to-metal seals and elastomeric seals engaging an outer wall (sealing surface) of the casing hanger within the annulus.
Figure 3:
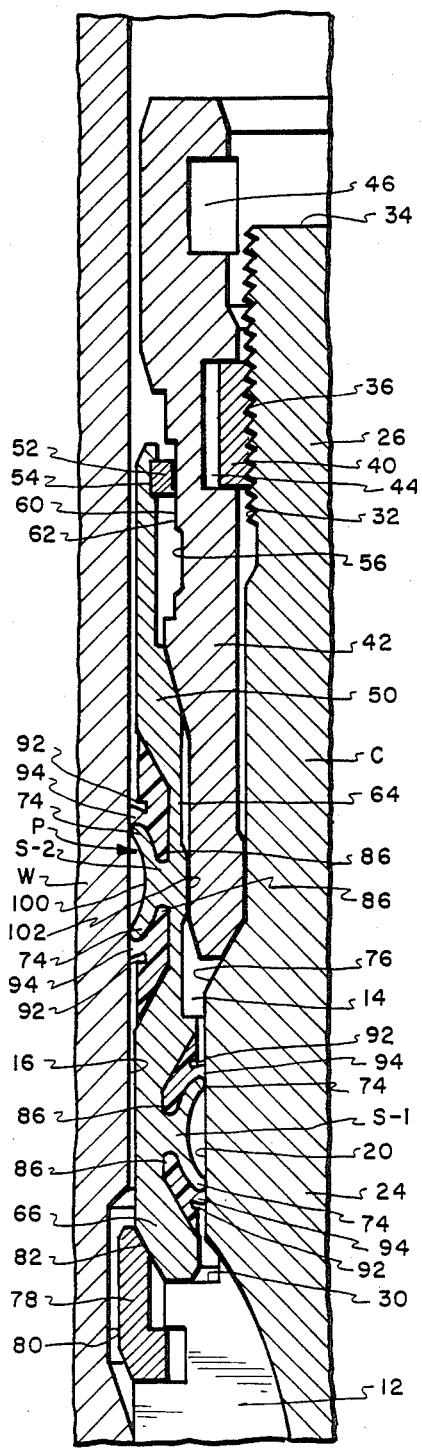
FIG. 3 is a view similar to FIG. 2 but showing the wedge ring having been lowered behind (radially inwardly of) the second metal-to-metal seal and urging the latter together with the elastomeric seal into sealing engagement with the inner wall bore (second sealing surface) of the wellhead.

Taking FIGS. 1-3 of the drawing first, the invention is depicted as having already landed in a wellhead housing W (outer tubular member) with a casing hanger C (inner tubular member) which is supported on a suitably outwardly facing seat or shoulder (not shown) in the bore of the wellhead housing W. Such a support for the casing hanger C in the wellhead housing W is conventionally and well known.

The casing hanger C is lowered from a vessel or platform to the wellhead housing W on a running tool (not shown) which is conventionally connected to one end of a string of tubing, such as drill pipe, and set (supported) in the wellhead prior to the lowering of the pack-off assembly P being lowered to the wellhead W.

Also, a wear bushing (not shown) may be lowered with the casing hanger. The manner in which the casing hanger and wear bushing pack-off assembly are connected to the running tool is not material to this invention.

In the position as shown in FIG. 1, circulating and cementing operations can be conducted in the usual manner through circulating passages 12 and the annulus or space 14 between the cylindrical inner wall, or bore, 16 of the wellhead housing W and the opposing cylindrical wall 20 of the casing hanger C. Upon completion of the cementing operations, the annulus 14 is sealed by a pack-off assembly P. How this is accomplished will be described, infra.

The depicted casing hanger C comprises a main body section 24 integral with an upper section 26 and provided with a cylindrical inner bore (not shown), the circulating passages 12 and a shoulder (abutment) 30. Not shown are the threads at the lower end of the casing hanger C to support threaded casing in the well in the conventional and known manner.

As shown in FIG. 2, the upper section 26 of the casing hanger C is provided with external threads 32 immediately below the mouth of the casing hanger (only the top edge 34 being shown). These threads are wicker threads engageable with mating wicker threads 36 on a split ring 40 as part of a wedge ring 42 of the pack-off assembly P. The wedge ring 42 is cylindrical and provided with a radially inwardly opening groove 44 containing the split wicker ring 40. The groove 44 is deep enough to provide a clearance for the expansion and contraction of the wicker ring 40 as it ratchets over the wicker threads 32 on the casing hanger C. The wedge ring 42 is also provided with J-slots 46 (only one is partially shown) to cooperate with lugs in the running tool for lowering the pack-off assembly P into the wellhead W. The wicker ring 40 is one of the two types of lock-down means previously referred to.

The pack-off assembly P includes the aforementioned wedge ring 42 with its wicker ring 40 and a pack-off or seal portion 50. In the embodiment disclosed herein, the pack-off 50 is connected to and supported on the wedge ring 42.

The pack-off 50 is connected to the wedge ring 42 through a swivel connection accomplished by a split retainer ring 52 mounted in complementary grooves 54 and 56. Groove 56 in the wedge ring 42 is the deeper one of still another groove 60 in the wedge ring to provide a locking surface 62 to lock the split retainer ring 52 against contraction to facilitate retrieval of the pack-off assembly P if necessary. The locked position of the split retainer ring 52 is shown in FIG. 3. Groove 60 also allows relative axial movement between the wedge ring 42 and the pack-off 50.

As shown, the pack-off 50 includes a long relatively thin integral metallic pack-off body 64 extending above the aforementioned groove 56 and ending in an abutment ring 66. Between the top of the pack-off body 64 at the abutment ring 66, the pack-off body 64 is provided with two offsets 70 and 72 forming part of two metal-to-metal seals; one seal S-1 for engaging the cylindrical wall 20 of the casing hanger and the other seal S-2 for engaging the bore 16. The lower metal-to-metal seal S-1, as shown in the drawings, is referred to as the "first" metal-to-metal seal since it is the first to be actuated as the annulus 14 is being sealed. Since both metal-to-metal seals S-1 and S-2 are identical, except that they are oppositely acting, only one will be described in detail.

Thus, the lower or first metal-to-metal seal S-1 comprises a pair of metal sealing lips 74 which are adapted to engage the side wall 20 in an interference fit after ramping up a conical surface 76 on the casing hanger C thus sealingly engaging the wall 20 under compression. This is depicted clearly in FIG. 2. At this time, the abutment ring has engaged the abutment 30 of the casing hanger C and a split locking ring 78, which is held on the casing hanger C, is urged into a groove 80 in the wellhead in order to lock the casing hanger C in the wellhead. The abutment ring 66 is provided with a conical ramp surface 82 to facilitate engagement between the split locking ring 78 and the abutment ring 66. The pack-off 50 is considered initially set in this position in that the first metal-to-metal seal S-1 has sealingly engaged the wall 20. Behind each lip 74 is a space 86 made as the lips are formed. These spaces allow slight bending of the lips 74 as they engage the wall 20.

In the event that the optional elastomeric seal is desired, the spaces 86 can be provided (filled) with elastomeric material 90 which extends radially towards the wall 20 the same amount as the ends of the lips and is provided with expansion grooves 92. These grooves 90 are more clearly shown in the embodiment shown in FIGS. 7 and 8. Elastomeric sealing rings 94, formed by the elastomeric material 90 and the expansion grooves 92 in combination with the two metallic lips 74 provide a combined metal-to-metal and elastomeric seal.

As mentioned previously, the second or upper metal-to-metal seal S-2 engages the well bore wall 14. Since the first metal-to-metal seal S-1 engaged upon downward movement thereof due to the interference fit relationship between the ends of the lips 74, and the wall 20, the second metal-to-metal seal S-2 does not engage the wall 16 in sealing relationship as the pack-off is lowered into the annulus 14. In order to actuate the seal S-2, the wedge ring 42 is lowered further by the weight running string (drill pipe) or by system pressure. This wedges the wedge ring 42 behind the second seal S-2 where the outer wall 100 of the wedge ring 42 engages a radial enlargement 102 immediately behind the center of the seal S-2 thus forcing the lips 74 of seal S-2 as well as the lips 94 of the elastomeric material, if the latter are used, into sealing engagement with the bore 16 of the well housing. During this further lowering of the wedge ring 42, the wicker ring 40, of course, ratchets over the wicker threads 36 on the casing hanger C.

From the foregoing, it can be seen that the second seal S-2 engaging the wellhead bore is not actuated gradually during installation of the pack-off, preventing hydraulic pressure buildup during insertion, thus reducing the chance of the pack-off to land high. Also, the actuation of this second seal S-2 is independent of the actuation of the first seal S-1 and is engaged by radial force when the pack-off 50 is in correct position within the well.

Figure 4:
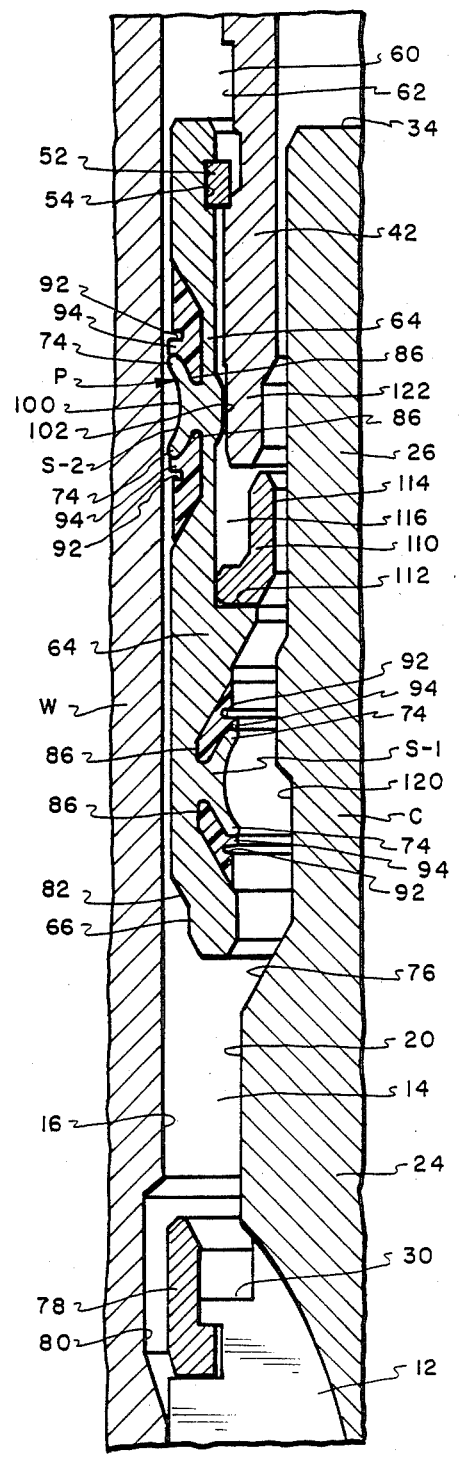
FIG. 4 is a view similar to FIG. 1 of the second embodiment with the pack-off assembly above the annulus but with a locking ring located behind (radially inwardly of) the pack-off to be actuated by the wedge ring.
Figure 5:
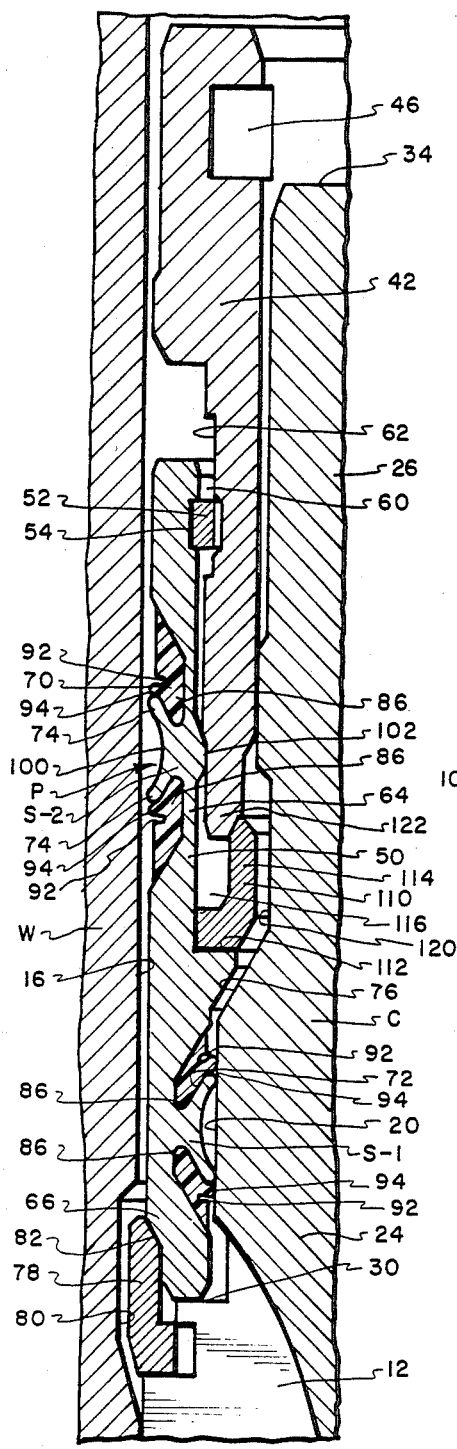
FIG. 5 is a view similar to FIG. 2 showing a second type of lock down (locking ring) and the first metal-to-metal seal engaging, the sealing surface of the casing hanger within the annulus.
Figure 6:
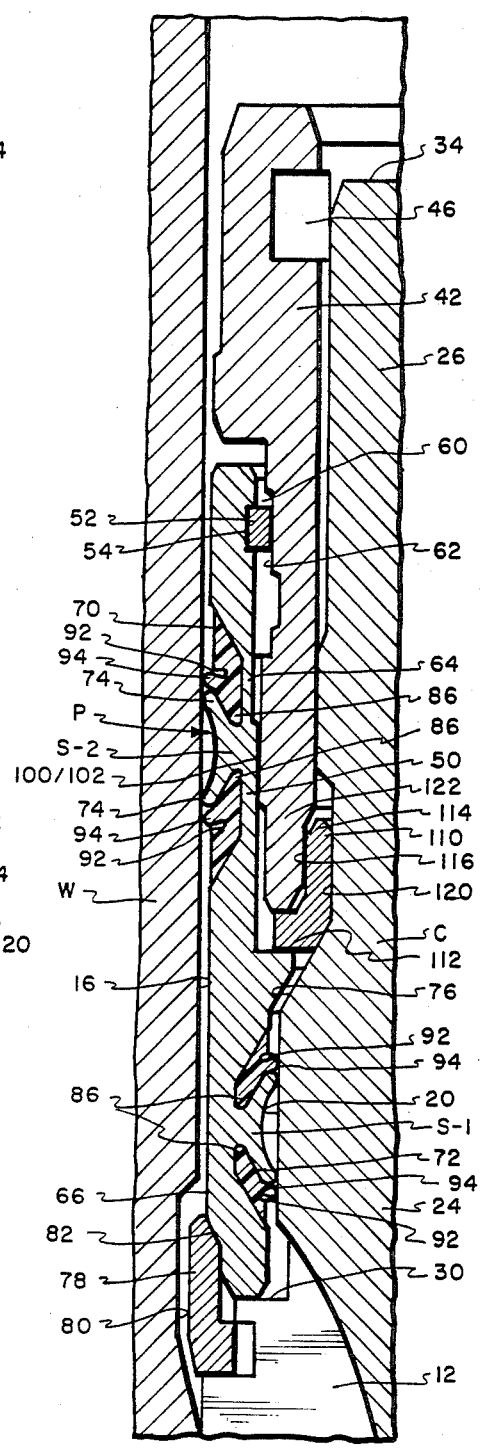
FIG. 6 is a view similar to FIG. 3 showing the wedge ring urging the metal-to-metal seal and elastomeric seal radially outwardly into engagement with the bore of the wellhead and showing the locking ring urged into a groove on the casing hanger.

Turning now to the second embodiment of the invention shown in FIGS. 4-6, it can be seen that the first and second seals S-1 and S-2 are identical and function in exactly the same way. The difference between the previously described embodiment and this embodiment lies in the lock-down means. In the prior embodiment of FIG. 1-3, the lock-down means comprises the wicker ring 40 mating with wicker threads 32 on the casing hanger C; but in this embodiment, the pack-off 50 is provided with a second split ring 110 located midway between the first and second seals S-1 and S-2 on the side of the casing hanger C. This split ring 110 is seated on an upwardly facing ledge 112 formed on the pack-off body member 64 and the upright portion 114 of the ring is spaced as at 116 from the pack-off body member 64 to allow the wedge ring 42 to enter this space 116 and urge the split ring 110 into a groove 120 formed in the casing hanger C. The lower end 122 of the wedge ring 42 has been reduced (thinned) to facilitate entry of the latter into the space 116 for urging the split ring radially inwardly. The steps of locking the pack-off by this second type of lock-down means clearly illustrated; in FIG. 4 where the split ring is above the groove 120 in the casing hanger C; in FIG. 5, where the lower end 122 of the wedge ring 42 is engaging the top of the split ring 110 with the split ring 110 horizontally in line with the groove 120; and in FIG. 6 with the lower end 122 of the wedge ring 42 has moved the split ring 110 into the groove 120 in the casing hanger C.

FIGS. 7 and 8 show another embodiment of the metal-to-metal seal and/or combined metal-to-metal seal and elastomeric seal which may be substituted for any one or all of seals S-1 or S-2. Since the manner of engaging the side wall to form the sealing relationship of the metal-to-metal seal or the combination of metal-to-metal and elastomeric seal is the same as in the prior figures, same reference reference numerals are used but with the suffix. The sole difference is in the arrangement of the metallic lips 74a. In the prior embodiments, the lips 74 were "Y" branches extending from the pack-off body member 64, whereas in this embodiment, the metallic lips 74a form a "T" extending from the pack-off body member 64a. These two figures also are enlarged over those of FIGS. 1-6 to show more clearly the bending of the lips and the formation of the elastomeric seal.

Retrieval of the pack-off assembly is the reverse of the setting of the pack-off assembly with a running tool engaging J-slots 46 and rotation the wedge ring 42 to disengage the wicker threads 36 and 40 of the embodiment of FIGS. 1-3 or simply pulling up on the wedge ring 42 to allow the lock-down ring 110 to contract and move out of the groove 120 of the embodiment of FIGS. 4-6.

I claim:

1. In combination:
an outer body member having an internal cylindrical sealing surface;
an inner body member within said body member and having an external cylindrical sealing surface;
said inner body member being radially spaced from said outer body member; and
a pack-off assembly including a wedging means movable longitudinally of said sealing surface, said pack-off including a first metal-to-metal sealing means sealingly engageable with said external sealing surface with an interference fit therebetween and a second metal-to-metal sealing means engageable to said internal cylindrical sealing surface,
said second sealing means being spaced from said internal sealing surface until activated by said wedging means by movement of said wedging means radially inwardly of said second sealing means thereby imposing a radially outwardly directed force on said second sealing means.

2. The combination as claimed in claim 1 further including elastomeric sealing means in combination with said metal-to-metal sealing means.

3. The combination as claimed in claim 1 wherein said pack-off is supported by said wedging means.

4. The combination claimed in claim 2 wherein said outer body member is a wellhead and said internal cylindrical sealing surface is the bore of said wellhead and wherein said inner body member comprises a casing hanger and said external cylindrical sealing surface is an outer wall on said casing hanger.

5. The combination as claimed in claim 2 further including lock-down means for locking said pack-off assembly between said outer body member and inner body member.

6. The combination as claimed in claim 5 wherein said lock-down means comprises a split wicker ring on said wedging means engageable with wicker threads on said inner body member.

7. The combination as claimed in claim 5 wherein said lock-down means comprises a split ring on said pack-off assembly engageable with a groove on said inner body member.

8. A well seal assembly for sealing between the interior surface of a wellhead and the exterior surface of a casing hanger, said casing hanger being spaced from and facing the interior surface of said wellhead comprising;
a seal assembly including,
wedging means,
a pack-off sealing means, including two oppositely acting metal-to-metal seals,
an abutment means positioned between said wellhead and said casing hanger,
means for shifting said seal assembly toward and into engagement with said abutment means and to actuate one of said pack-off seal means into sealing engagement with said exterior surface,
means for shifting said wedging means between the other of said metal-to metal seals and said casing hanger after said seal assembly has engaged said abutment and urging said second sealing means radially into engagement with said interior surface and into sealing engagement therewith.

9. The combination as claimed in claim 8 wherein said first metal-to-metal sealing means engages said external sealing surface with an interference fit therebetween.

10. The combination as claimed in claim 9 further including elastomeric sealing means in combination with said metal-to-metal sealing means.

11. The combination as claimed in claim 9 further including lock-down means for locking said pack-off assembly between said wellhead and said casing hanger.

12. The combination as claimed in claim 11 wherein said lock-down means comprises a split wicker ring on said wedging means engageable with wicker threads on said casing hanger.

13. The combination as claimed in claim 12 wherein said lock-down means comprises a split ring on said pack-off assembly engageable with a groove on said casing hanger.

14. A seal assembly for sealing two cylindrical walls spaced from one another comprising;
a first metal-to-metal sealing means positioned in said space between said inner and outer walls and engaging one of said walls in an interference fit sealing relationship,
a second metal-to-metal sealing means positioned in said space between said inner and outer walls and initially spaced from one of said walls, and means for wedging the said second metal-to-metal sealing means radially into sealing engagement with the other of said walls by moving said wedging means between said inner wall and said second metal-to-metal seal.

15. The combination as claimed in claim 14 further including elastomeric sealing means in combination with said metal-to-metal sealing means.

16. The seal assembly as claimed in claim 14 wherein said first and second metal-to-metal sealing means are connected by a single metallic part and wherein elastomeric material is located between said first and second metal-to-metal sealing means and said metallic part to form elastomeric sealing means in combination with said metal-to-metal sealing means.

17. The seal assembly as claimed in claim 14 wherein said wedging of said second metal-to-metal sealing means radially is accomplished indepndently of said first metal-to-metal sealing means.

* * * * *